Feb. 7, 1961  F. E. BRADY, JR  2,970,719
WELDED TANK STRUCTURE AND METHOD OF MAKING SAME
Filed May 14, 1957
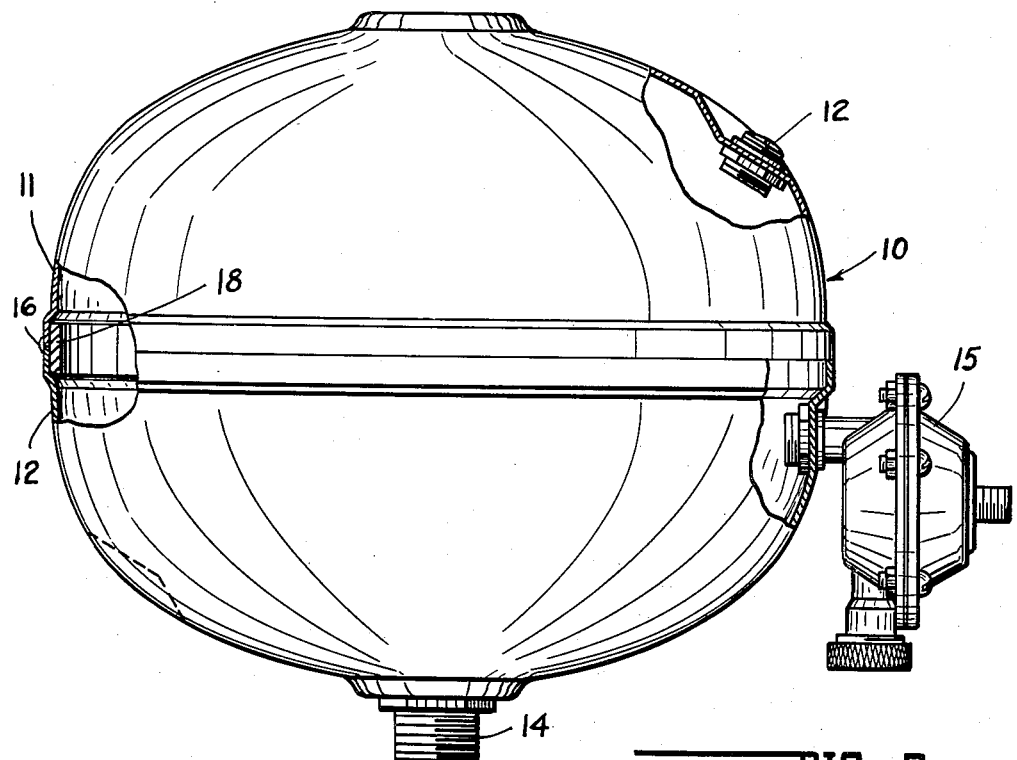
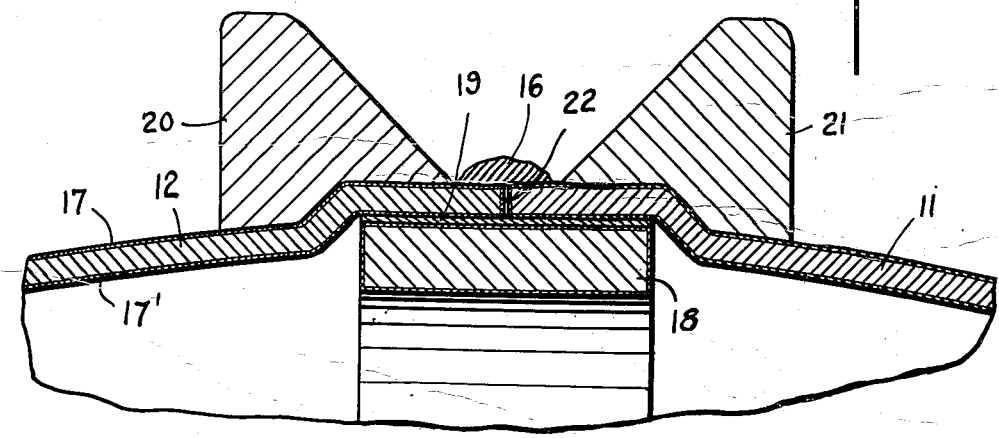
INVENTOR.
FRANCIS E. BRADY, JR.
BY
Lockwood, Galt, Woodard & Smith
ATTORNEYS.

INVENTOR.
FRANCIS E. BRADY, JR.
BY Lockwood, Galt, Woodard & Smith
ATTORNEYS.

INVENTOR.
FRANCIS E. BRADY, JR.

2,970,719
WELDED TANK STRUCTURE AND METHOD OF MAKING SAME

Francis E. Brady, Jr., R.R. 6, Muncie, Ind.

Filed May 14, 1957, Ser. No. 659,457

4 Claims. (Cl. 220—75)

This invention relates generally to welded tanks having galvanized external and interior surfaces. More particularly this invention relates to an improved welded tank, together with a welding process for forming said welded tank.

This application is a continuation-in-part of my application Serial No. 417,884, filed March 22, 1954, now abandoned, and a continuation in part of my application Serial No. 451,393, filed August 23, 1954, now abandoned.

It is conventional practice in the manufacture of tanks such as water tanks for domestic water systems to form and weld sheet metal into a tank and then to dip the tank in a galvanizing bath for coating the interior and exterior surfaces of the tank with zinc. This is a relatively expensive process and adds a substantial amount to the cost of a galvanized tank.

It is also conventional practice to add a coating of galvanizing material to sheet iron immediately as the sheet comes out of the forming rolls. This is a more or less automatic operation which adds a relatively small amount to the cost of the sheet iron. Accordingly, it would be more economical to build galvanized tanks from sheet metal which has a galvanizing coating on it prior to the tank forming operation.

The obstacle which has prevented manufacture of tanks from galvanized sheet metal consists of the fact that it has heretofore been impossible to weld the surfaces of galvanized sheet metal to one another without boiling off, burning or oxidizing or otherwise damaging the coating of galvanize or zinc adjacent to the weld. This is due to the fact that welding temperatures are far above the boiling temperature of zinc, and, hence, the zinc may be boiled off or burned or otherwise removed at welding temperatures. In the case of a tank, chill rings can be applied under high pressure to the outer surface thereof to hold the temperature within safe limits; but there is no way to apply chill rings under high pressure to the inner surface of a tank.

There are disclosed in the prior art various types of apparatus and various methods for forming tanks or barrels or for forming welded pipe joints which include the use of chill rings adjacent to the surfaces of the metal parts which are to be welded to one another. Actual tests show that these various types of apparatus and the several methods of the prior art do not operate satisfactorily when used for manufacturing galvanized sheet metal tanks. This is particularly true where galvanized sheet metal is used having a thickness of the order of .040", commonly known as "20 gauge." Sheet metal of this order of thickness has sufficient structural strength to withstand the pressures normally used in domestic water systems, provided that a sufficiently large weld is applied to the seam or seams in the tank. If a sheet metal tank is intended to withstand maximum pressures of 140 pounds per square inch, a weld at least 5/16" wide is required. On the other hand, if a sheet metal tank were to be designed to withstand only 10 pounds per square inch pressure, a weld 1/16" wide would be sufficient. The prior art does not disclose or teach apparatus or methods adaptable for welding sheet metal tanks with welds sufficiently wide to withstand the required pressures without damage to the protective coating or to the sheet metal itself. It is impossible to form tank parts and internal chill rings to tolerances such that metal-to-metal contact is established between the surfaces of the tank parts and the inner and outer chill rings which will provide sufficient conduction of heat to prevent burning of the metal or loss of the galvanizing coating. Experiment shows that there must be actual metal-to-metal contact between the chill rings and the sheet metal adjacent to the weld. If there is the smallest air pocket between the surfaces of the chill rings and the sheet metal, there is burning of the galvanizing coating or burning of the sheet metal, or there are pin holes or similar defects adjacent to the welded joint.

Accordingly it is the principal object of this invention to provide a welding apparatus and process for forming welded tanks of relatively lighter gauge sheet metal than heretofore has been possible and wherein substantially maximum metal-to-metal contact is established between the surfaces of the sheet metal adjacent to the welded joint and the surfaces of the inner and outer chill rings.

Another object of this invention is to prevent the removal of zinc coating from galvanized sheet metal in the manufacture of tanks having galvanized surfaces.

Another object of this invention is to provide a tank structure of such character that it is possible to weld the component parts of the structure to one another without removing or burning the zinc coating adjacent to the welded portions of the structure.

Still another object of this invention is to provide a tank structure of such character that pressure may be applied to the component parts of the tank being welded to establish extremely intimate contact between the said parts, thereby to provide a high heat conductivity path sufficient to dissipate welding heat at such a rate that burning of a zinc coating may be prevented.

A further object of this invention is to provide a closed tank having an inner chill ring of such character that the tank surfaces to be welded may be moved into intimate contact with said chill ring, thereby to provide highly efficient conduction of heat to said chill ring.

A still further object of this invention is to provide for a closed tank an internal chill ring of such character that the tank structure adjacent to the chill ring engages the surfaces of the chill ring with continuous metal-to-metal contact and having no air pockets between the chill ring and the adjacent internal surfaces of the tank.

In accordance with this invention there is provided a welded and galvanized tank structure comprising tank portions formed to be joined with one another by means of a weld, a chilling means mounted adjacent to the interior surfaces of the adjoining portions of the tank structure, and a layer of metal disposed between said chilling means and the adjoining portions of said tank, said metal in said layer having a melting point no higher than that of zinc.

In accordance with this invention there is provided a welded and galvanized tank structure comprising tank portions formed to be joined with one another by means of a weld, and a chilling means mounted adjacent to the interior surfaces of the adjoining portions of the tank structure and having a relatively intimate friction fit with respect to said interior surfaces, whereby external pressure may be applied to the outer surfaces of the adjoining portions of said tank for establishing high heat conductivity contact between the inner surfaces of said adjoining portions and said chilling means, said chilling means serving to support said external pressure during the welding process.

In accordance with another feature of this invention there is provided a process of welding a galvanized tank structure comprising the steps of forming a plurality of tank portions, assembling said tank portions in juxtaposition to one another on a chill ring in frictional contact therewith to form a closed tank, applying high pressure to the tank portions supported by said chill ring to establish high heat conductivity contact between said chill ring and said tank portions, and applying a weld to the seal between said tank portions.

In accordance with a further feature of this invention, there is provided a welded and galvanized tank structure comprising tank portions formed to be joined with one another by means of a weld, and a chilling means mounted adjacent to the interior surface of the adjoining portions of the tank structure, said chilling means comprising a metallic ring having a crowned outer surface and a maximum diameter slightly in excess of the normal inner diameter of said tank portions, whereby said tank portions are expanded when assembled to said metallic ring.

The full nature of the invention will be understood from the accompanying drawings and the following description and claims:

Fig. 1 is a side elevation view of a tank embodying this invention and having parts broken away to show the structure provided in accordance with this invention;

Fig. 2 is an enlarged cross section of the welded seam between the adjoining tank portions shown in Fig. 1 with the addition of external chill rings adjacent to the welded seam of the tank illustrated in Fig. 1;

Figure 3:
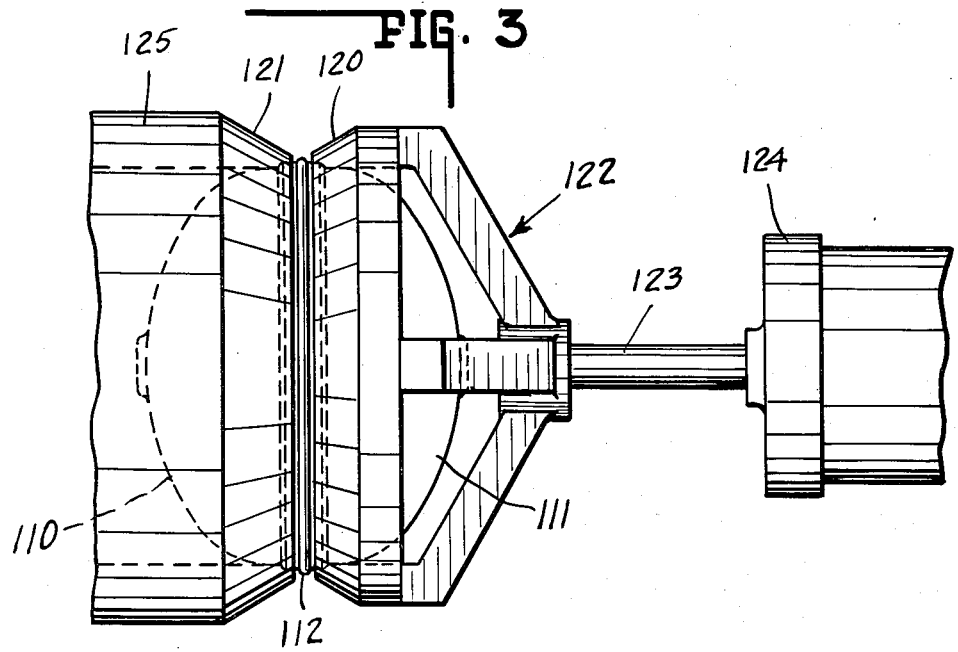
Fig. 3 is a side elevation view illustrating a tank as provided by this invention and apparatus for applying pressure to said tank for welding purposes.

In order to illustrate the invention, the drawings show a water tank of the type particularly adapted for use in domestic water supply systems. There is provided a tank 10 having an upper half-portion 11 more or less hemispherical in form and including a drain plug 12. The tank includes a lower half-portion 12 having attached thereto a water inlet and outlet fitting 14 and a conventional air control device 15. This type of tank as described so far is entirely conventional.

The two halves of tank 10 may be joined together by means of a weld 16. The tank 10 is formed of galvanized sheet iron or steel approximately .040" in thickness commonly known as 20 gauge. Iron or steel of this thickness is cited as typical, but it will be understood that twenty-four gauge sheet iron or steel of a thickness of .027" is adequate to meet the pressure requirements of the conventional domestic water system having a small tank. Even thinner gauges, such as twenty-eight gauge sheet steel, are capable of withstanding the standard pressure test for domestic water systems and can be used when welded in accordance with this invention.

As explained herein, it is possible to obtain, as a standard product, sheet iron or steel which is galvanized on both sides to form the interior and exterior coatings 17 and 17'. Accordingly, in accordance with this invention, tanks of the type described can be formed and welded of galvanized sheet iron or steel. Within the tank and adjacent to the seam which is to be welded, there is provided a chill ring 18 which overlaps the seam to a substantial degree and may consist of a band of twelve gauge galvanized sheet iron or steel, cut to the proper length to extend completely around the interior of the tank, and positioned adjacent to the seam and held there by the natural resilience of the metal. For the purpose of preventing rust, the chill ring 18 may be completely galvanized or coated with zinc.

According to one procedure included within the present invention, before the ring 18 is mounted in its assembled position, the exterior surface thereof is coated with a layer 19 of low melting point metal such as tin solder, which should have a melting point below 550° F., and preferably of approximately 400° F. Oxidation of zinc occurs at 550° F. and accelerates rapidly as temperature increases. Therefore, in order to prevent such oxidation, it is desired to provide the layer of metal 19 having a melting point well below the oxidation point of zinc.

Chill rings 20 and 21, which may be of any high heat conductivity metal such as beryllium copper, may be placed adjacent to the seam 22 as illustrated in Fig. 2. There are known methods of applying pressure between the chill rings and the tank portions to obtain sufficiently intimate contact between the outer surface of the tank and the inner surfaces of the chill rings, thereby to insure good conduction of heat as between the tank and the chill rings. The weld 16 may then be applied in an atmosphere of argon, for example, so that the exterior coating 17 of the tank, which may be exposed between the weld and the chill rings, will be protected from contact with oxygen, preventing oxidation of the galvanized surface.

The temperature of the weld may be of the order of 1525° F., which normally would cause oxidation or burning of the galvanized coating on the interior surfaces of the tank adjacent to the seam 22. This effect is largely prevented due to the fact that the coating of solder 19 melts and establishes extremely intimate contact between the inner galvanized surface 17' adjacent to the seam and the exterior surface of the permanent chill ring 18. This intimate contact provides a most efficient conduction of heat from the weld to chill ring 18. It also provides a high conductivity path from the permanent chill ring 18 back through the walls of the tank into each of the outer chill rings 20 and 21. In this manner the temperature of the galvanized coating 17' adjacent to the weld seam is prevented from rising sufficiently to melt or oxidize the galvanize coating. This is also true of the galvanized surfaces of the permanent chill ring 18.

It is necessary to provide the heat conducting layer of solder 19 to establish the necessary intimate contact mentioned above. It would be impossible to apply from within the tank sufficient pressure to permanent chill ring 18 to eliminate any air gap between the outer surface of chill ring 18 and the inner surfaces of the tank. The layer of solder 19 facilitates the attainment of a perfect and completely uninterrupted heat conduction path between the outer rings 20 and 21 and the inner ring 18 through the optimum regions of the tank part edge portions and their respective coatings. Because of roughnesses, unevenness, and the difficulty of forming sheet metal to close tolerances, it is substantially impossible to press the surfaces of the tank edge portions by mechanical means into perfect and uninterrupted metal-to-metal contact with the cooperating surfaces of the several rings; but when the layer 19 melts and expands, it flows sufficiently between the inner ring and the associated tank edge surfaces to complete the requisite perfect and uninterrupted contact. Even if the air gap is reduced to one ten thousandth of an inch, the flow of heat across such a gap is too slow to prevent excessive temperature or burning temperature with respect to the zinc coating in the region of such a gap.

While the previously described welded structure and the process of forming it present definite and valuable advantages, it is found that it is quite expensive to utilize the layer of relatively low melting point metal. There is appreciable labor cost involved and, hence, it is found to be desirable to eliminate the use of such a layer.

Figure 4:
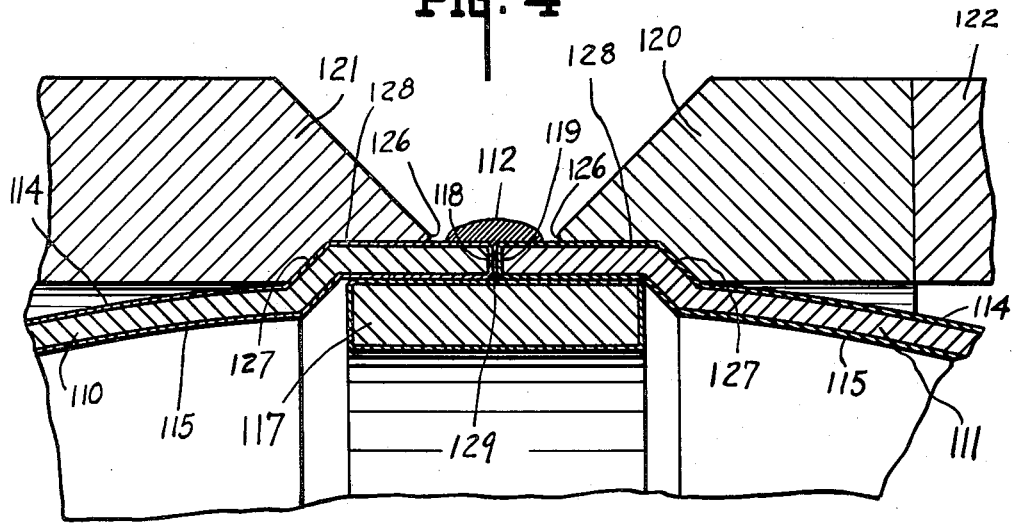
Fig. 4 is an enlarged, partial cross section of the tank illustrated in Fig. 3 and the pressure apparatus.

Referring to Figs. 3 and 4 of the drawings, there is provided in accordance with a modification of this invention, a similar water tank comprising a first half portion 110 and a second half portion 111 joined by means of a weld 112. Standard galvanized sheet iron or steel having interior and exterior coating 114 and 115 is formed in a manner similar to that illustrated in Fig. 1 and welded to provide a tank. Within the tank and adjacent to the seam which is to be welded, there is provided a chill ring 117 which overlaps the seam to a substantial degree and may consist, for example, of a band of twelve gauge galvanized sheet iron or steel, cut to the proper length to extend completely around the interior of the tank and positioned adjacent to the seam and held there by the natural resilience of the metal. For the purpose of preventing rust, the chill ring 117 may be completely galvanized or coated with zinc.

Chill ring 117 is formed to have an external diameter slightly smaller than the inside diameter of the mating edges 118 and 119 of the half portions 110 and 111 of the tank. The object is to provide a relatively close and frictional fit or "precision" fit between the outer surface of chill ring 117 and the inner surfaces of the mating edges of the tank portions such that the tank portions may be assembled manually on the chill ring 117.

In order to establish a relatively high heat conductivity contact between chill ring 117 and the mating edges of tank portions 110 and 111 there are provided external chill rings 120 and 121, chill ring 120 being supported on the spider 122 mounted on the piston rod 123 of a hydraulic cylinder 124. The chill ring 121 may be mounted on a stationary fixture 125, and thus the tank halves 110 and 111 may be clamped when hydraulic cylinder 124 is energized to move spider 122 and chill ring 120 into pressure contact with tank portions 110 and 111.

The chill rings 120 and 121 are formed to have a rather blunt leading edge 126, while each tank portion is provided with a formed shoulder 127. Each of the chill rings is formed to have an inner surface 128 conforming to the outer surface of the mating edges of the tank portions. The inner diameter of the chill ring at 128 is approximately .010 inch smaller than the outer diameter of the mating edges of the tank portions. Thus, the chill rings apply relatively high presure to the mating edges of the tank portion.

As described before, chill ring 117 is dimensioned to have a frictional fit with respect to the mating edges of tank portions 110 and 111. In order to weld a given tank, chill ring 117 may be pushed within the edge 118 of tank portion 110, and then tank portion 111 may be fitted on over the chill ring 117, this operation being performed manually to position the chill ring and tank parts as illustrated in Fig. 3. The assembled tank parts may then be pushed manually into either one of the chill rings 120 or 121 to such a point that frictional engagement will hold the tank within the chosen chill ring. Hydraulic cylinder 124 may then be energized to move spider 122 and chill ring 120 to the left (Fig. 3), whereby the nose 126 of chill ring 120 and the nose portion of chill ring 121 ride over the external surfaces of the mating edges of tank portions 110 and 111. Because the chill rings have a smaller inside diameter than the outside diameter of the tank portions, substantial radial pressure is impressed on the mating edges of the tank portions. At this point chill ring 117 serves as part of the tank structure to withstand the pressure of the chill rings 120 and 121. Since chill ring 117 is a circular member, it can withstand relatively high pressures without collapsing. Therefore, mating edges 118 and 119 are moved into extremely intimate and high conductivity contact with the outer surface of chill ring 117. This close contact reduces the volume of air around the contacting surfaces to the practicable minimum and prevents any detectable oxidation of the zinc coating.

The weld 112 may then be applied in an atmosphere of argon, for example, so that the exterior coating 114 of the tank, which may be exposed between the weld and the chill rings, will be protected from contact with oxygen, prevening oxidation of the galvanized surface.

The temperature of the weld may be of the order of 1900° F. Oxidation of zinc actually starts at approximately 550° F., and the rate of oxidation with respect to increase of temperature follows a parabolic curve. Melting of zinc starts at approximately 700° F., and oxidation becomes more severe above this temperature so that by the time the temperature of the zinc coating reaches 750°, complete oxidation would have occurred and the coating would no longer have any protective value. Boiling, oxidation or burning of the galvanized coating on the interior surfaces of the tank adjacent to the seam 129 is prevented due to the fact that the high pressure created between the inner surfaces of the chill rings 120 and 121 and the exterior surfaces of the tank portions 110 and 111 and the high pressure created between the interior surfaces of said tank portions and the external surface of chill ring 117, establishes substantially uninterrupted contact through these surfaces and provides efficient conduction of heat between these surfaces and reduces the possibility of oxygen contact therewith. The high pressure contact is attained in part by careful dimensioning of chill ring 117. This is an important feature of this phase of my invention in that the length of the chill ring must be held within a tolerance of .005 inch instead of the usual sheet metal workers' working tolerance of 1/32 of an inch.

More efficient condition of heat also occurs when the zinc coating melts on the inner surfaces of the tank at the weld and on the outer surface of the chill ring 117. As the zinc melts, there is expansion thereof, which necessarily increases the pressure between the interior surfaces of the tank portions and the outer surface of ring 117. This results in expulsion of any remaining air or oxygen. Heat from the weld 112 may travel through the zinc coatings 114 and 115, through the tank portions, through chill ring 117 and again through the coatings and tank portions to chill rings 120 and 121 at such a high rate that, in view of the above explained protection from oxygen, the galvanized coatings immediately adjacent to the weld seam will not be oxidized. The establishment of these efficient heat flow paths also prevents oxidation or melting of the galvanized coating in the region laterally beyond the chill ring 117. In the regions spanned by the outer surface of the chill ring 117, melting of the zinc coating becomes advantageous in that it increases the heat conductivity between the various parts, thereby increasing the rate of heat dissipation to prevent burning of the tank portions or the zinc coatings. In this region, of course, the coatings are protected against oxygen contact to an extent sufficient to prevent oxidation or burning. The inner chill ring prevents the zinc coating from flowing off the tank surfaces or off the chill ring surfaces whereby after the welding process the zinc coating may cool and resume its original state.

As explained hereinbefore, the prior art fails to teach either an apparatus or a process whereby sheet metal tanks may be provided with a weld sufficiently strong to withstand the necessary internal pressures without damaging the protective coating or the sheet steel. Under laboratory conditions, modifications illustrated in Figs. 1, 2, 3 and 4 appeared to be satisfactory but when commercial production of these modifications of the invention was attempted, it was found that there was a scrap loss of substantially 66⅔%. Investigation showed that continuous metal-to-metal contact was not perfectly maintained between the inner and outer chill rings and the tank parts adjacent to the weld. This is probably because tank parts formed of such light gauge sheet metals cannot conveniently be manufactured under normal production conditions to tolerances sufficiently close to provide substantially continuous metal-to-metal contact between the tank parts and the chill rings. Sheet metal of such light gauges cannot be machined or otherwise worked to such close tolerances that surface irregularities are completely eliminated. Also handling of the parts including the chill rings in a factory unavoidably causes slight surface irregularities, such as dents.

Lack of such metal-to-metal contact even in what would appear to be a very small area results in destruction of the galvanized coating adjacent to that area and sometimes burning of the iron or steel, and also creation of pin holes in the weld or in the sheet metal adjacent to the weld. Tanks having defects such as these are valueless as commercial products and have to be scrapped. Lack of completely continuous metal-to-metal contact occurs most frequently in the welding of tanks which are not circular but have a form approaching that of an ellipse, for example. Many tanks are manufactured commercially having an elliptical form and actual experiment shows that it is extremely difficult to maintain sufficiently close tolerances with respect to the chill rings and with respect to the circumferential dimensions of the tank parts to insure uninterrupted metal-to-metal contact and complete elimination of air pockets between the chill rings and the tank parts.

Figure 5:
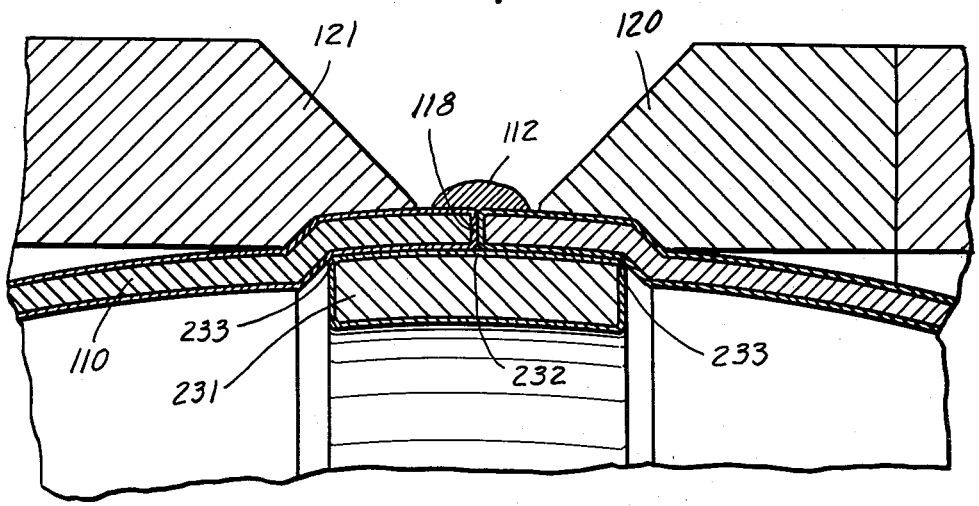
Fig. 5 is an enlarged, partial cross section of the tank illustrated in Figs. 3 and 4 and showing a modification of the inner chill ring.

Accordingly the modification of the invention illustrated in Fig. 5 has for its purpose to insure completely uninterrupted metal-to-metal contact or sufficient metal-to-metal contact that any air between the surfaces of the chill rings and the tank parts will be positively expelled by molten galvanize material during the welding process. This modification of the invention has the effect of completing the precision fit even though the tank parts are not precisely formed to extremely close tolerances. Corresponding parts of the modifications shown in Figs. 3, 4 and 5 bear identical reference numerals. As shown in Fig. 5, the inner chill ring 231 has a different cross-sectional shape from the chill rings illustrated in the other figures of the drawing in that its outer circumferential surface is crowned or arcuate when viewed in cross section. It has been found that great improvement results in the welding process when the radius at 232 (Fig. 5) of the outer surface of chill ring 231 exceeds the radius of chill ring 231 at the edge portions 233 by approximately .019″. If the radius at the edges 233 of chill ring 231 is slightly less than the inner diameter of the tank parts, the tank part such, for example, as 110 may be forced over the outer surface of chill ring 231 until the edge 118 extends approximately over one-half of the outer surface of chill ring 231. As shown in Fig. 5, there is continuous contact between the outer surface of chill ring 231 and the inner surface of the chill ring 231 actually expands the diameter of tank part 110 by approximately .006 inch to .012 inch. This stretching of tank part 110 has the effect of creating a substantial amount of pressure between the outer surface of chill ring 231 and the inner surface of tank part 110.

Figure 6:
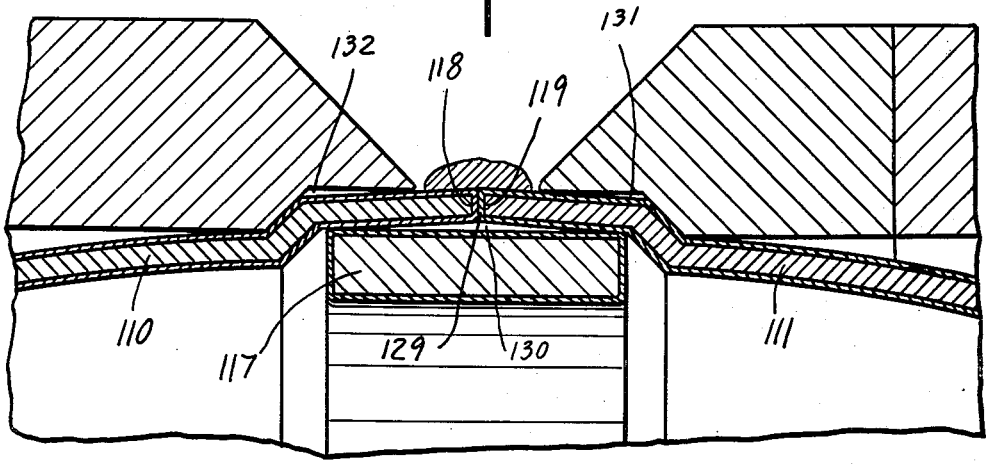
Fig. 6 is an enlarged, partial cross section illustrating separation of portions of the tank from the inner chill ring which causes defective welding.

In Fig. 6 of the drawing I have illustrated, with some exaggeration, the condition which sometimes arises in the practice of the invention according to the arrangements illustrated in Figs. 1–4. If, as shown in Fig. 6, the external diameter of the chill ring 117 is substantially equal to, or slightly larger than, the internal diameter of one or both of the enlarged edge portions of the tank parts 110 and 111, engagement of said ring in such edge portion, and subsequent relative telescopic movement thereof, will tend to produce a flare in the tank edge portion, whereby the extremity of such edge portion will be shifted radially outwardly away from contact with the surface of the inner chill ring to leave a space 130; and this deformation may likewise leave spaces 131 and 132 between the tank edge portions and the cooperating surfaces of the outer chill rings.

Thus tests have shown that, in the practice of the invention in accordance with the method illustrated in Figs. 1–4 imperfect contact between the tank edge portions and the inner chill ring frequently occurs when the several parts are imperfectly dimensioned. As stated before, even a very slight gap between the chill rings and the associated tank parts has been found to cause burning of the galvanize and, to all intents and purposes, destruction of the tank. The modification of the invention shown in Fig. 5 compensates for the natural tendency of the overlapping portions of the tank parts 110 and 111 to separate from the outer surface of chill ring 117. The crowned surface of chill ring 231 is raised at the center so that the edges 118 and 119 constantly stretch in circumference until they meet, and this stretching action insures that the maximum degree of metal-to-metal contact in a chill ring is maintained across its entire outer surface.

As a result of the improvement illustrated in Fig. 5, maximum conduction of heat is obtained from the weld 112 through the overlapping portions of parts 110 and 111 and through inner chill ring 231 to the outer chill rings 120 and 121. This modification of the invention has been found completely to prevent boiling, oxidation or burning of the galvanized coating on both the inner and outer surfaces of the tank. It is believed that the substantially perfect metal-to-metal contact which is established due to the high pressure existing between chill ring 231 and the overlapping portions of the tank reduces air pockets to the absolute minimum and if there are any air pockets, they are so small that melting galvanize expels any air from these pockets thereby establishing perfect metal-to-metal contact and maximum conduction of heat. This modification also has the various advantages explained herein in connection with the structures shown in Figs. 1, 2, 3 and 4. As a result, the invention disclosed herein makes it possible to weld commercially successful tanks using sheet metal which is relatively much thinner and of lighter gauge than was possible prior to this invention.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A welded tank structure comprising a pair of tubular metal shells having mating ends of uniform diameter provided upon their inner and outer surfaces with a protective metallic coating susceptible of melting and vaporizing at a relatively low temperature compared to the metal of the shells, a metal chilling member having a coating of the same characteristics and engaged within said shell ends and having an outer transversely convex surface, said mating ends originally have the same inner diameter as the outer surfaces of the lateral edges of said member and being stretched under tension over the outer surface of said member with their extremities disposed adjacent to one another at the mid-portion of said member and with the inner surfaces of said ends in tight face-to-face contact with the underlying surfaces of said member, and a weld formed at a temperature higher than the melting and vaporizing temperature of the coating metal and joining the mating ends of said shell portions, said shells being fused to the facing surfaces of said chilling member by said coating metal when said weld is applied to form a continuous metallic heat conductive path between said shell ends and said chilling member.

2. A welded tank structure comprising a pair of tubular steel shells having mating ends of uniform diameter provided upon their inner and outer surfaces with a protective coating of galvanize, a metal chilling member having a coating of galvanize and engaged within said shell ends and having an outer transversely convex surface, said mating ends originally having substantially the same inner diameter as the outer surfaces of the lateral edges of said member and being stretched under tension over the outer surface of said member with their extremities disposed adjacent to one another at the mid-portion of said member and with the inner surfaces of said ends in tight face-to-face contact with the underlying surfaces of said member, and a weld formed at a temperature higher than the melting and vaporizing temperature of the galvanize and joining the mating ends of said shell portions, said shells being fused to the facing surfaces of said chilling member by said galvanize when said weld is applied to form a continuous metallic heat conductive path between said shell ends and said chilling member.

3. The method of forming a tank from a pair of open ended tubular metal sections coated on the inner and outer surfaces at and adjacent their meeting edges with a metal susceptible of melting and vaporizing at a relatively low temperature compared to the metal of the sections, and a metal chill member having a coating of the same characteristics and the outer surface of which is transversely convex and of greater diameter at its mid-section than that of said sections, comprising the steps of forcing the open ends of said sections over the exterior surface of said chill member whereby expansion of said meeting edges will occur midway of the member and the adjoining shell surfaces will be in intimate contact with the surface of said member from the mid-portion thereof to its lateral edges, and welding the meeting edges of the sections together at a temperature substantially higher than the melting and vaporizing temperature of the coating metal to join the abutting edges of said shells and melt the coatings adjacent to the weld to form a continuous metallic heat conductive path between said section ends and said chill member.

4. The method of forming a tank from a pair of open ended tubular steel sections coated on the inner and outer surfaces at and adjacent their meeting edges with galvanize, and a metal chill member having a coating of galvanize and the outer surface of which is transversely convex and of greater diameter at its mid-section than that of said sections, comprising the steps of forcing the open ends of said sections over the exterior surface of said chill member whereby expansion of said meeting edges will occur midway of the member and the adjoining shell surfaces will be in intimate contact with the surface of said member from the mid-portion thereof to its lateral edges, and welding the meeting edges of the sections together at a temperature substantially higher than the melting and vaporizing temperature of the galvanize to join the abutting edges of said shells and melt the galvanize adjacent to the weld to form a continuous metallic heat conductive path between said section ends and said chill member.

References Cited in the file of this patent

UNITED STATES PATENTS

| | | |
|---|---|---|
| 1,499,770 | Gruenfeldt | July 1, 1924 |
| 1,682,403 | Murray | Aug. 28, 1928 |
| 2,125,324 | Williams et al. | Aug. 2, 1938 |
| 2,206,375 | Swift | July 2, 1940 |
| 2,337,049 | Jackson | Dec. 21, 1943 |
| 2,412,271 | Kercher | Dec. 10, 1946 |
| 2,558,360 | Jadoul | June 26, 1951 |